(12) United States Patent
Damarla

(10) Patent No.: US 7,673,002 B1
(45) Date of Patent: Mar. 2, 2010

(54) SYSTEM AND METHOD FOR E-MAIL MESSAGE ACTION REQUESTS

(75) Inventor: S. S. Satyanarayana Damarla, Bangalore (IN)

(73) Assignee: Sun Microsystems, Inc., Santa Clara, CA (US)

( * ) Notice: Subject to any disclaimer, the term of this patent is extended or adjusted under 35 U.S.C. 154(b) by 1336 days.

(21) Appl. No.: 10/785,873

(22) Filed: Feb. 24, 2004

(51) Int. Cl.
G06F 15/16 (2006.01)

(52) U.S. Cl. .................................................. 709/206

(58) Field of Classification Search ................. 709/206; 707/200, 103; 705/10, 14, 12; 345/752
See application file for complete search history.

(56) References Cited

U.S. PATENT DOCUMENTS

| | | | |
|---|---|---|---|
| 5,930,471 A * | 7/1999 | Milewski et al. | 709/204 |
| 6,055,510 A * | 4/2000 | Henrick et al. | 705/14 |
| 6,212,553 B1 | 4/2001 | Lee et al. | |
| 6,816,885 B1 * | 11/2004 | Raghunandan | 709/206 |
| 7,062,536 B2 * | 6/2006 | Fellenstein et al. | 709/206 |
| 7,191,221 B2 * | 3/2007 | Schatz et al. | 709/206 |
| 7,233,961 B2 * | 6/2007 | Sampson | 707/200 |
| 7,406,504 B2 * | 7/2008 | Paul | 709/206 |
| 2002/0032600 A1 * | 3/2002 | Royall et al. | 705/10 |
| 2002/0032602 A1 * | 3/2002 | Lanzillo et al. | 705/14 |
| 2002/0065893 A1 * | 5/2002 | McCormack | 709/206 |
| 2002/0188683 A1 * | 12/2002 | Lytle et al. | 709/206 |
| 2003/0043188 A1 * | 3/2003 | Daron | 345/752 |
| 2003/0200137 A1 * | 10/2003 | Drummond | 705/12 |
| 2003/0233412 A1 * | 12/2003 | Smith et al. | 709/206 |
| 2005/0209914 A1 * | 9/2005 | Nguyen et al. | 705/14 |
| 2007/0083552 A1 * | 4/2007 | Allen et al. | 707/103 R |

* cited by examiner

*Primary Examiner*—Dustin Nguyen
(74) *Attorney, Agent, or Firm*—Robert C. Kowert; Meyertons, Hood, Kivlin, Kowert & Goetzel, P.C.

(57) ABSTRACT

A system, method and computer accessible medium for e-mail message action requests is disclosed. E-mail clients and servers may associate action requests with outgoing or incoming e-mail messages. Action requests may inform e-mail recipients that the e-mail message requires a particular action. E-mail clients and servers may maintain and/or display counts of the number e-mail messages associated with various action requests. E-mail clients may also display these counts to the user. E-mail clients and servers may change a requested action after receiving an e-mail message associated with an action request. Additionally, e-mail clients may announce the arrival of e-mail messages with attached requested actions to the user and may provide various user notifications indicating the specific requested action.

63 Claims, 10 Drawing Sheets

900

| Action Request: | Sender: | Subject: |
|---|---|---|
| Read Request | Johndoe@johns_isp.com | Review Notes |
| Read Request | Janedoe@janes_isp.com | Re: Review Notes |
| Read Request | Johndoe@johns_isp.com | Re: Review Notes |
| Respond Request | Johndoe@johns_isp.com | Re: Review Notes |
| Respond Request | Janedoe@janes_isp.com | Re: Review Notes |
| Respond Request | Janedoe@janes_isp.com | Re: Re: Review Notes |
| Respond Request | Johndoe@johns_isp.com | Re: Re: Re: Review Notes |
| NoAction Request | Johndoe@johns_isp.com | Don't Review |
| NoAction Request | noone@nowhere.com | SPAM |

912 — rows 1–3
914 — rows 4–7
916 — rows 8–9

| Action Request: | Sender: | Subject: |
|---|---|---|
| Read Request | Johndoe@johns_isp.com | Review Notes |
| Read Request | Janedoe@janes_isp.com | Re: Review Notes |
| Read Request | Johndoe@johns_isp.com | Re: Review Notes |
|  |  |  |
|  |  |  |
|  |  |  |
|  |  |  |
|  |  |  |
|  |  |  |

962

922   924   926

FIG. 9B

SYSTEM AND METHOD FOR E-MAIL MESSAGE ACTION REQUESTS

BACKGROUND OF THE INVENTION

1. Field of the Invention

This invention relates to computer systems generally and more particularly to the field of electronic mail messaging.

2. Description of the Related Art

People receive many and various kinds of e-mail messages every day. Different messages require different actions by users. Most e-mail messages must be read, but not all. Some messages serve as simple notices. The subject alone tells the user all they need. Shipping notices from online stores fall into this category. Spam e-mail messages only require deletion, but many e-mail messages require the user to read them. Of those messages, some require responses.

Managing the standard inbox and keeping track of which e-mail messages are unread, those that have been read, those that require responses and that those that have already been answered may be part of a user's daily routine.

E-mail client programs provide various levels of functionality in regards to handling e-mails. A thin client is a piece of software that is designed to be very small, and therefore relies upon a server to perform most system functions and data processing. A thin e-mail client therefore relies upon an e-mail server to manage most of the processing associated with e-mail messages.

Web browser based e-mail clients are generally thin clients. With each program session these clients may download and display the headers for the current set of messages stored on the server. The user can then use the information displayed about the sender, received date, subject and other data to choose which e-mail messages to view. Once the user has requested to view the body of, or "opened" a specific e-mail message, the thin client may download the full message content from the server. In general, thin clients do not store the actual messages contents beyond the current program session.

Other clients, sometimes called "thick" or "fat" clients, perform much of the processing associated with e-mail messages themselves. Generally they will periodically download entire messages, including full message content, from an e-mail server and store them locally. This allows users to view messages even when not connected to the e-mail server. These clients typically do not rely upon the server to provide any statistics about e-mail messages other than informing the client about new messages that can be downloaded.

SUMMARY

Embodiments of a system, method and computer accessible medium for e-mail message action requests are disclosed. In certain embodiments, action requests may indicate an action that is requested of the message recipient. An e-mail client or server may associate action request with e-mail messages and may maintain counters of the number of e-mail messages that have been received with associated action requests according to various embodiments. E-mail servers may provide these counters to other devices, processes, and software programs, while e-mail clients may display these counters to the user in various ways, in some embodiments. E-mail clients may display action requests counters and may notify users of the arrival of e-mail messages with associated action requests in various way, according to various embodiments.

BRIEF DESCRIPTIONS OF THE DRAWINGS

FIG. 9A illustrates an embodiment of an e-mail client configured to sort e-mail messages by their associated action requests according to one embodiment.

FIG. 9B illustrates an embodiment of an e-mail client configured to filter e-mail messages by their associated action requests.

DETAILED DESCRIPTION OF VARIOUS EMBODIMENTS

Figure 1:
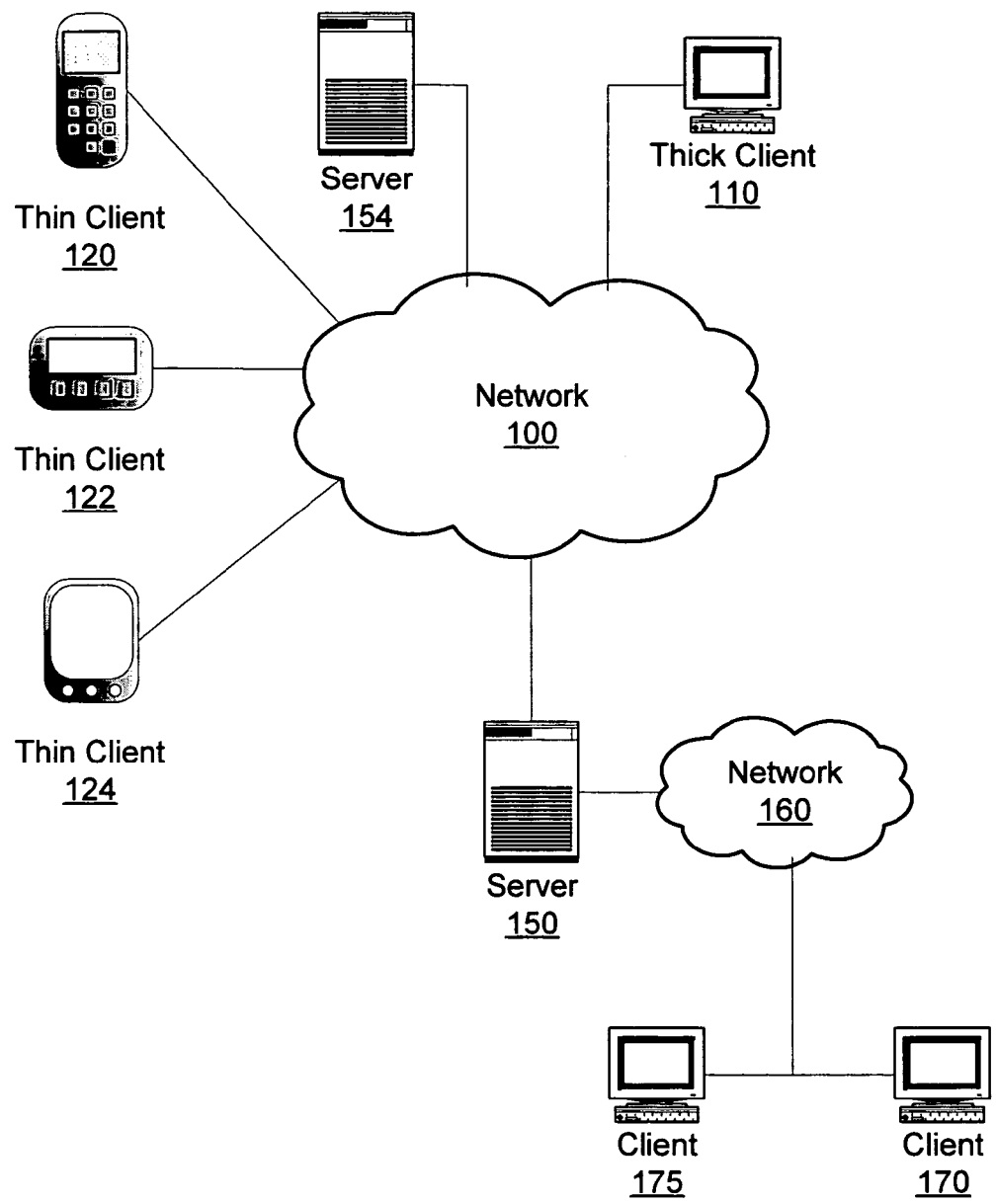
FIG. 1 illustrates, according to one embodiment, a networked system including various computer devices that may be configured to implement e-mail message action requests.

A system may be provided by which users may define various action requests to attach or 'associate' with individual e-mail messages, according to various embodiments. When an e-mail client receives an e-mail message it may then display an associated action request to inform the recipient of the specific nature of the requested action. One example of an action request, according to one embodiment is a respond request. In various embodiments, a user may associate a respond request with an outgoing e-mail message to ensure that the recipient understands that the sender wishes a reply.

Other examples of action requests, according to various embodiments, may include, but are not limited to, read requests, respond requests, read and respond requests, file requests, print requests, review requests or no-action requests. An e-mail message with an associated no-action request may be different than an e-mail message not having an associated action request. An e-mail message without an associated action request does not convey any information regarding what action, if any, the e-mail message requires, whereas a no-action request may indicate that the associated e-mail message requires no action. The difference being that in the former case (no associated action request) the recipient isn't informed whether the e-mail message requires action or not, whereas in the latter case (an associated no-action request) the recipient is informed that the e-mail message requires no action. A no-action request might be used in cases where the e-mail message subject includes all the information the e-mail message is intended to convey.

A user may also define additional action requests. In one embodiment, an e-mail client may be configured to allow a user to type an action request for each outgoing e-mail message. According to another embodiment, the e-mail client may be configured to allow the user to choose an action request from a list displaying previously used action requests.

Action requests may indicate more than one requested action. For example, a user may use a "Review and File" action request to indicate that the recipient should review the contents of the e-mail message as well as file it for future use. In addition, E-mail clients and servers may associate more than one action request with a single e-mail message, according to one embodiment.

An E-mail client or server may be configured to support a predetermined list of action requests. A system administrator or other user may configure this predetermined list of action requests, or the e-mail client or server, may configure such a list automatically. For example, in one embodiment, a company's system administrator may define a standard list of action requests and then configure all the e-mail clients and servers within the company to use that same list of predetermined action requests. According to another embodiment, individual users may add additional action requests to an already configured set of predetermined action requests.

An originating e-mail client may associate an action request with an e-mail message before transmitting it. For instance, a user may send out e-mail invitations to a birthday party and associate an RSVP action request with each e-mail message, according to one embodiment.

Alternatively, an e-mail server may associate action requests with outgoing or incoming e-mail messages. The e-mail server may decide which action request to associate with a particular e-mail message (either incoming or outgoing) using configurable policies or rules. In one embodiment, a system administrator may setup an e-mail processing policy that configures an e-mail server to associate a "don't open" action request with e-mail messages that have been determined to possibly contain a virus. Alternatively, in another embodiment, the system administrator may set up a policy that instructs an e-mail server to associate all incoming messages from customers with a respond request.

In other embodiments, e-mail clients may be configured to automatically associate incoming messages with action requests according to policies and rules as described above. For example, in one embodiment, a recipient may desire to have all e-mail messages from his boss associated with a read request. Therefore, when an e-mail message from the recipient's boss is received, the e-mail client may associate a read request with that e-mail message. In certain embodiments, it may be a web-browser based e-mail client that performs this association between the action request and the e-mail message. In such a case, according to one embodiment, the web-browser based e-mail client may then inform the e-mail server of the new association so the server can update the user's mailbox.

Web browser based or thin e-mail clients may be configured such that with each program session these clients may download and display the headers for the current set of messages stored on the server. In some embodiments, thin clients may download an associated action request with the header of an e-mail message. The user may then use the information displayed about the sender, received date, subject and other data to choose which e-mail messages to view and/or act upon. According to one embodiment a user may use the associated action request to help choose which e-mail message to view next. Once the user has requested to view or "open" the body of, a specific e-mail message, a thin client may download the full message content from the server.

In some embodiments, e-mail servers and clients may change which action request is associated with an e-mail message. E-mail servers and clients may change the associated action request based upon information in or about the e-mail message or based upon other information or rules. For example, in one embodiment, the recipient may desire to have all e-mail messages from a specific sender be associated with a respond action request even when e-mail messages from that sender are already associated with a different action request. For instance, an e-mail client might be configured to change a read request on an incoming e-mail message to a read and respond request. In some embodiments, the recipient's e-mail client may change the associated action request for certain e-mail messages, whereas in other embodiments, the e-mail server may be configured to change the associated action request.

In addition to possibly changing what action request is associated with an e-mail message, e-mail clients and servers may be configured to add one or more additional action requests to the e-mail message, in one embodiment. For example, according to certain embodiments, an e-mail server may be configured to add a respond request to certain e-mail messages in addition to other associated action requests.

In some embodiments, e-mail clients may notify the recipient of the arrival of e-mail messages with associated action requests. In certain embodiments, e-mail clients may announce the arrival of e-mail messages with specific associated action requests. In other embodiments, e-mail clients may announce the arrival of any e-mail message with an associated action request regardless of what type of action is requested. Notifications of arrived e-mail messages with associated action request may be performed in different manners in different embodiments. In certain embodiments, e-mail clients may display alert messages or pop-up windows informing the recipient about the arrival of e-mail messages with associated action requests. In various embodiments notifications may take the form of playing audio files, displaying graphic icons, or the sending of instant messages. In some embodiments e-mail clients may utilize multiple ways to notify the user. For example, an e-mail client may display a pop-up alert box, play an audio file, and display a graphic icon when an e-mail message with a particular action request is received.

FIG. 1 illustrates a system of networked computer devices, according to one embodiment, in which e-mail messaging may be employed, and in which one or more devices may be configured to implement e-mail message action requests. According to one embodiment, at least one computing device on network 100 may be an e-mail client device, such as Thick Client 110, Thin Client 120, Thin Client 122, Thin Client 214, Client 170, and Client 175 and may include software configured to create, send and/or receive e-mail messages. Client devices 110, 120, 122, 124, 170 and 175 may be configured to create action requests, associate action requests with e-mail messages, display action requests, or maintain action request counters. An e-mail client device may be any of various types of devices, including, but not limited to, a personal computer system, desktop computer, laptop or notebook computer, mainframe computer system, handheld computer, workstation, network computer, a consumer device such as a mobile phone, pager, PDA, a smart appliance, or any type of networkable peripheral device such as storage devices, switches, modems, routers, etc, or in general any type of networkable computing device with a digital heartbeat capable of executing e-mail processing software. Such e-mail processing may include, but is not limited to creating, sending, receiving, storing, or displaying e-mail messages, e-mail addresses, or other information about e-mail messages or e-mail message communication. In some embodiments, such e-mail processing may include creating, sending, receiving, or displaying e-mail message action requests.

Thick client 110, Thin Client 120, Thin Client 122, Thin Client 124, Client 170 and Client 175 may be configured to couple over Network 100 or Network 160 to one or more other devices via one or more wired or wireless network interfaces and may be configured to exchange e-mail message or information about e-mail messages according to one or more networking or messaging protocols such as IP, TCP, TCP/IP, UDP, ICMP, FTP, TELNET, POP, POP2, POP3, IMAP2, IMAP2bis, IMAP3, IMAP4, IMAP4rev1, ACAP, DMSP, PCMAIL, SMTP, ESMTP, MIME or PEM. The foregoing list of networking and messages protocols is intended to be exemplary only, and is not intended be limiting in any way. E-mail client devices may be configured to communicate using other network or messaging protocols apart from those listed.

In another embodiment, at least one computing device coupled to network 100 may be an e-mail server device, such as Server 154 or Server 150 that may include software configured to create, send and/or receive e-mail messages. Additionally, an e-mail server device, such as Server 154 or Server 150, may be configured to create and associated action requests with e-mail messages. An e-mail server device may be any of various types of devices, including, but not limited to, a personal computer system, desktop computer, laptop or notebook computer, mainframe computer system, handheld computer, workstation, network computer, a consumer device such as a mobile phone, pager, PDA, a smart appliance, or any type of networkable peripheral device such as storage devices, switches, modems, routers, etc, or in general any type of networkable computing device with a digital heartbeat capable of executing e-mail processing software. Server 154 or Server 150 may be configured to couple over Network 100 or Network 160 to one or more other devices via one or more wired or wireless network interfaces and may be configured to exchange e-mail message or information about e-mail messages according to one or more networking or messaging protocols such as IP, TCP, TCP/IP, UDP, ICMP, FTP, TELNET, POP, POP2, POP3, IMAP2, IMAP2bis, IMAP3, IMAP4, IMAP4rev1, ACAP, DMSP, PCMAIL, SMTP, ESMTP, MIME or PEM. The foregoing list of networking and messages protocols is intended to be exemplary only, and is not intended be limiting in any way. E-mail server devices may be configured to communicate using other network or messaging protocols apart from those listed.

According to one embodiment, Thin Clients 120, 122, and 124 may be any of various types of devices as listed above for Thick Client 110, and may be capable of communicating e-mail messages, information about e-mail messages, or e-mail message action requests. Thin Clients 120, 122, and 124 may be configured to create and associate e-mail message action requests. In certain embodiments, Thin Client 120, 122, or 124 may be a network terminal capable of running web browser based e-mail client software. In other embodiments, however, Thin Clients 120, 122, or 124 may be a personal computer running any of a number of operating systems capable of implementing web browser software and may be configured to implement a web browser based e-mail client.

Web browser based e-mail clients and thin clients, such as Thin Clients 120, 122, and 124, may, with each program session, download and display the headers for the current set of e-mail messages stored on the server. According to one embodiment, thin clients may download and display any action requests associated with the current set of e-mail messages stored on the server. The user may then use the information displayed about the action request, the sender, received date, subject and other data to choose which e-mail messages to view, according to one embodiment. Once the user has requested to view the body of, or has "opened" a specific e-mail message, the thin client may download the full message content from the server. Thin Clients 120, 122, and 124 may not store the actual message contents beyond the current program session, according to some embodiments.

Network 100 and Network 160, as illustrated in FIG. 1, may comprise any of various network technology according to certain embodiments. Network 100 or Network 160 may be a local area network, wide area network, intranet network, Internet network, or many other types of network. Networks 100 and 160 may be designed to be continuously available (although network outages may occur), or may be intermittent (e.g. a modem connection made between a computer system in a user's home and a computer system in a user's workplace). Network 100 or Network 160 may utilize any of a number of different physical networking technologies including, but not limited to Fiber Channel, Ethernet, Fast-Ethernet, Gigabit-Ethernet, Myrinet, VAX CI, or ServerNet, or others. Networks 100 and 160 may be configured according to a number of different network topologies including, but not limited to star, token-ring, token-bus, scatternet, dual-ring, mesh, etc. Networks 100 and 160 may also be configured to utilize a combination of different networking technologies and/or topologies. Additionally, Network 100 and Network 160 may comprise shared storage or shared memory for communicating between different computer systems or between processes within the same computer system, according to some embodiments.

As illustrated in FIG. 1, according to one embodiment, Server 150 may be coupled to multiple different networks. For example, an e-mail server may be connected to the Internet as well as to the company's local Ethernet network. According to certain embodiments, Server 150 may provide e-mail processing services for Clients 170 and 175 utilizing Network 160, as well as transmit e-mail messages across Network 100, which may be the Internet, to Thin Clients 120, 122, 124, Thick Client 110 or Server 154.

Figure 2A:
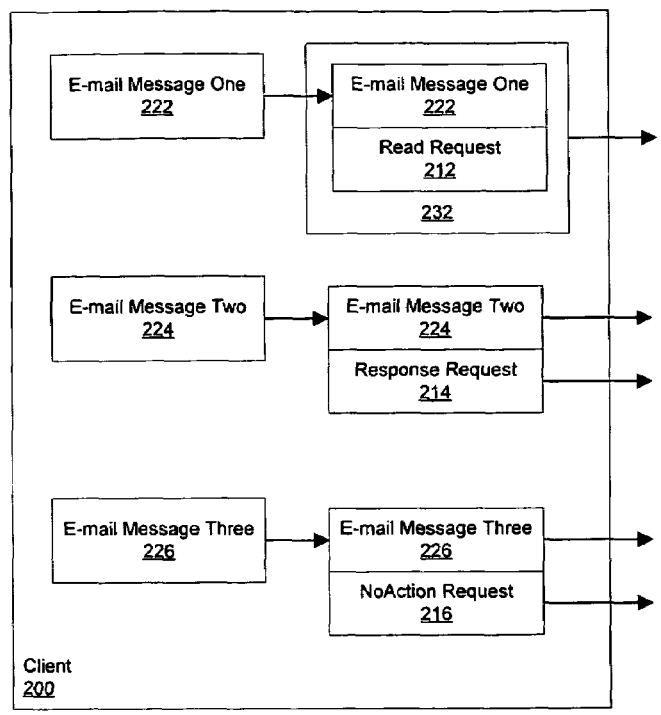
FIG. 2A illustrates a block diagram of an e-mail client, according to one embodiment, configured to implement e-mail message action requests.

FIG. 2A illustrates various embodiments demonstrating an e-mail client associating action requests with e-mail messages. According to one embodiment, Client 200 may be an originating e-mail client used to create and send e-mail messages. In such an embodiment, Client 200 may be similar to such e-mail clients as Sun One Messenger Express, Pegasus Mail, Eudora, or Microsoft Outlook. Client 200 may differ from the e-mail client examples listed above in that Client 200 may be configured to implement e-mail message action requests as described herein.

As discussed above, a user may desire to associate action requests with outgoing e-mail messages. According to one embodiment, Client 200 may be configured to make three predetermined action requests, Read Request 212, Response Request 214, and No-action Request 216, available for a user to associate with outgoing e-mail messages, E-mail Message One 222, E-mail Message Two 224 and E-mail Message Three 226. As described above, in some embodiments, an e-mail message may be associated with a no-action request and may be quite different than an e-mail message not associated with an action request. A no-action request may inform the recipient that no action is requested, as opposed to the case of an e-mail not associated with an action request where the recipient does not know if the e-mail requires action or not.

As illustrated in FIG. 2A, a user may configure Client 200 to associate Read Request 212 with E-mail Message One 222, according to one embodiment. In one embodiment, the user may instruct Client 200 to associate Read Request 212 with E-mail Message One 222 by selecting Read Request 212 from a list of action requests displayed when E-mail Message One 222 is created. According to one embodiment, Client 200 may send E-mail Message One 222 and associated Read Request 212 out together as illustrated by block 232.

For example, according to one embodiment, Client 200 might include a flag called X-EMAIL-RSVP in the header fields of E-mail Message One 222 whose value may be "Read", "Respond", or "false." According to one embodiment, a value of "Read" may indicate that E-mail Message 222 is associated with Read Request 212, a value of "Respond" may indicate that E-mail Message 222 is associated with Response Request 214, while a value of "false" may indicate that E-mail Message 222 is associated with No-action Request 216. Using the embodiment described above and according to FIG. 2A, E-mail Message One 222 may have a X-EMAIL-RSVP flag value with a value of "Read."

In another embodiment, the user may wish to associate Response Request 214 with E-mail Message Two 224. In this embodiment, rather than associate Response Request 214 with E-mail Message Two 224 using a header field, as described above, Client 200 may be configured include Response Request 214 in the body of E-mail Message Two 224 in such a way that a receiving e-mail server or client may be able recognize the association.

In yet another example, according to yet another embodiment, client 200 may transmit No-action request 216 as an attachment to E-mail Message Three 326.

In other embodiments, Client 200 may communicate action requests separately along with information sufficient to identify the e-mail messages with which they are associated. For example, in one embodiment, Client 200 may be configured to transmit E-mail Message Three 226 and then to transmit a separate message, including No-action Request 216 and an identifier for E-mail Message Three 226.

The embodiments described above regarding FIG. 2A represent just a few of the many ways in which action request may be associated with e-mail messages. In addition, other embodiments may include fewer, additional or different action requests than those illustrated in FIG. 2A.

Figure 2B:
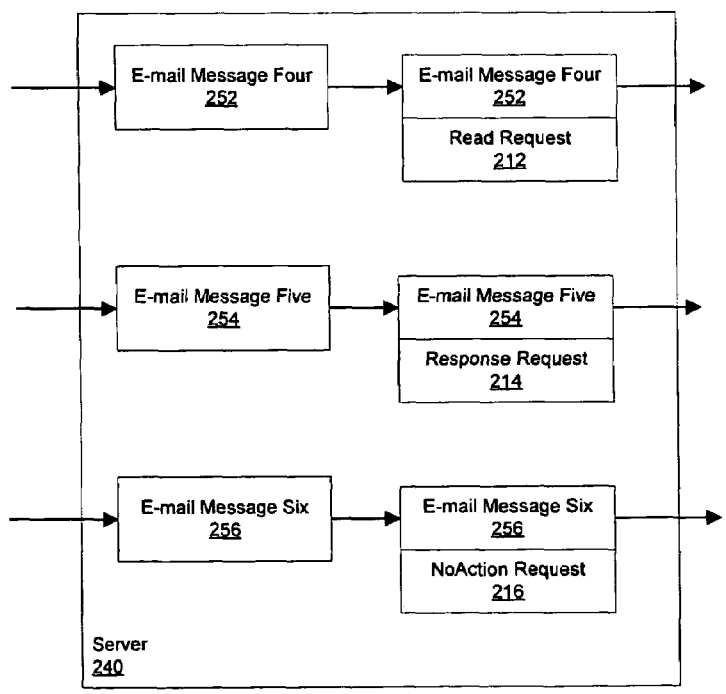
FIG. 2B illustrates a block diagram of an e-mail server, according to one embodiment, configured to implement e-mail message action requests.

FIG. 2B is a block diagram illustrating an embodiment where action requests may be associated with e-mail messages by Server 240. Unlike the previously discussed embodiment where Client 200 associated action requests with outgoing e-mail messages before transmitting them, in this embodiment Server 240 may associate action requests with incoming e-mail messages. As discussed above, Server 240 may be performing various roles involved in e-mail message action requests. In certain embodiments, Server 240 may be handling outgoing e-mail messages and associating action requests according to policies or rules configured by the sender of those messages, while in other embodiments, Server 240 may be handling incoming e-mail messages and associating action requests according to policies or rules configured by the receiver of those messages. In yet other embodiments, both the sender and receiver may be connected to Server 240 and therefore Server 240 may be configured to associate action requests for both the sender and receiver of e-mail messages.

Server 240 may be configured to associate action requests with e-mail messages under numerous conditions, according to different embodiments. According to one embodiment, Server 240 may be configured to associate different action requests with e-mail messages from different senders. E-mail Message Four 252 may be an outgoing message from a user named John, and Server 240 may be configured to use certain rules and policies when associating action requests with email messages from John. In one embodiment, Server 240 may be configured to always associate response requests with outgoing e-mail messages from John. In such an embodiment, Server 240 may be configured to associate Response Request 212 with E-mail Message Four 252 from John. E-mail Message Five 254 may be an outgoing e-mail message from Sue, and according to one embodiment Server 240 may be configured to associate response requests with messages Sue sends. In such an embodiment, Server 240 may associate Response Request 214 with E-mail Message 254.

In other embodiments, Server 240 may be configured to associate action requests with incoming email messages that have certain words or phrases in their subject. In one embodiment, E-mail Message Six 256 may have the phrase "Great Deals" in its subject. Perhaps, the phrase "Great Deals" is usually in the subject of spam e-mail message. According to one embodiment, Server 240 may be configured to associate No-action Request 216 to e-mail message with the phrase "Great Deals" in their subject. In such and embodiment, Server 240 may associate No-action Request 216 with incoming E-Mail Message Six 256.

FIGS. 2A and 2B are not meant to limit the manner or method used to associate action requests with e-mail messages. In one embodiment, Client 200 may add action requests as a field to the e-mail message header. In other embodiments, Server 240 may include action requests in the content of e-mail messages or add action requests as attachments to e-mail messages. In still other embodiments, Client 300 may communicate an action request separately from an e-mail message but still may associate it with the e-mail message through the use of message identifiers. Action requests may be associated with e-mail messages in numerous manners and methods different from those detailed herein.

FIGS. 3A-3E illustrate various embodiments demonstrating methods for associating an action request with an e-mail message at various points in the path between a Sending Client 300, and a Receiving Client 320, with a Server 310 in the middle. As shown by the embodiments illustrated in FIGS. 3A-3C, an action request may be associated with an e-mail message at various points along its path from a sending client, through a server and onto the receiving client. For ease of discussion, FIGS. 3A-3E illustrate only an e-mail server between two e-mail clients. Other embodiments may involve many more devices than those described herein. Additionally, for clarity and ease of description, the discussions of FIGS. 3A-3E describe e-mail messages as being transmitted from Sending Client 300 to Server 310 and also as being transmitted from Server 310 to Receiving Client 320. The use of the words "transmit" and "transmitted" are not intended to limit in any way how an e-mail message or action request, together or separate, may get from one device to another. In one embodiment, Server 310 may be the only device needed to route e-mail messages between Sending Client 300 and Receiving Client 320, while other embodiments may require many more devices to deliver an e-mail message from Sending Client 300 to Receiving Client 320.

Figure 3A:
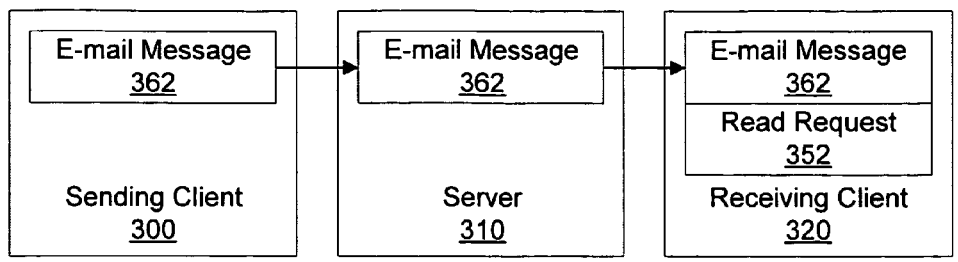
FIG. 3A is a block diagram illustrating, according to one embodiment, an e-mail client associating an action request with a received e-mail message.

FIG. 3A illustrates a situation, according to various embodiments, where a user has configured his e-mail client to associate an incoming e-mail message with a read request. As discussed above, a user may wish to associate action requests with incoming messages for various reasons. In one embodiment, the user may be awaiting a notification about the results of an online auction and may therefore wish to have all e-mail messages from a particular e-mail address be associated with a read request. Or, in another embodiment, a user may with to have all e-mail messages from a spam-sending e-mail address be associated with a delete request.

In one embodiment illustrated in FIG. 3A, Sending Client 300 may transmit E-mail Message 362 to Server 310 without an associated action request. Likewise, Server 310 may transmit E-mail Message 362 along to Receiving Client 320 without an associated action request. When Receiving Client 320 gets E-mail Message 362 it may associate it with Read Request 352. In another embodiment, the user may only want to flag a particular e-mail message to remind her to read it later, and therefore may manually associate Read Request 352 with E-Mail Message 362 herself.

In other embodiments, the user may configure Receiving Client 310 to associate action requests with e-mail messages automatically under various conditions. For instance, the user may configure Client 320 to associate Read Requests with all incoming e-mail messages, according to one embodiment. In other embodiments, Client 320 may be configured to associate Read Request 352 with E-mail Message 362 because it may come from a specific sender, or because it may contain certain keywords in its subject line. In other embodiments, the user may manually associate Read Request 352 with E-mail Message 362 individually.

Figure 3B:
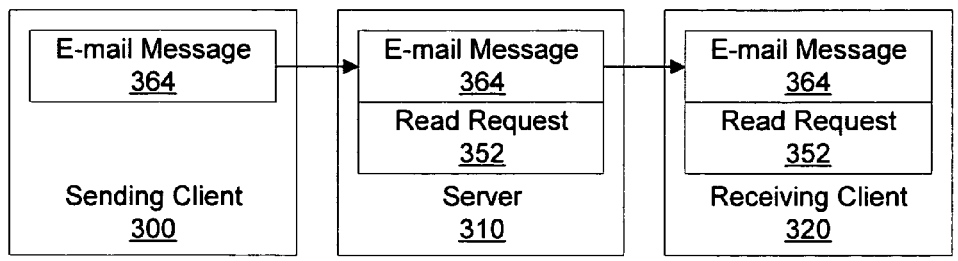
FIG. 3B is a block diagram illustrating, according to one embodiment, an e-mail server associating an action request with an e-mail message.

In one embodiment illustrated by FIG. 3B, a user may configure Server 310 to associate action requests with incoming e-mail messages for various reasons, including those discussed above for the embodiments illustrated in FIG. 3A. In addition, according to other embodiments, users may configure Server 310 to associate action requests with outgoing messages from Sending Client 300. In one embodiment illustrated in FIG. 3B, both Server 310 and Receiving Client 320 may be configured to associate read requests with e-mail messages. Server 310 may be configured by one user, Receiving Client 320 may be configured by a different user, or the both might be configured by the same user, in certain embodiments.

According to one embodiment, Sending Client 300 may transmit E-mail Message 364 to Server 310 without an associated action request. In this embodiment, unlike the one illustrated in FIG. 3A, Server 310 may be configured to associate Read Request 352 with E-mail Message 364, before sending it on to Receiving Client 320. In one embodiment, Receiving Client 320 may not be configured to associate incoming E-mail Message 364 with any action request. However, in another embodiment illustrated by FIG. 3B, both Server 310 and Receiving Client 320 may be configured to associate Read Request 352 with E-mail Message 364.

Figure 3C:
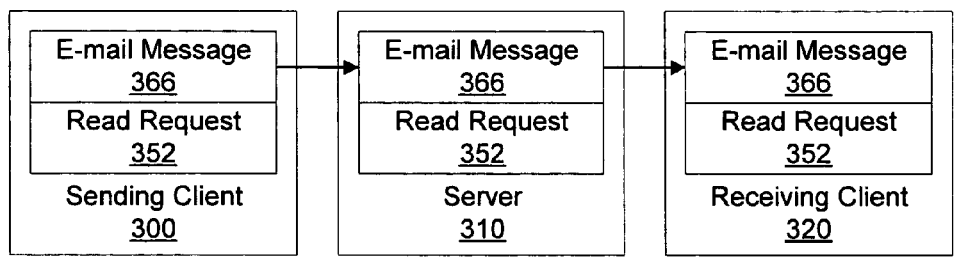
FIG. 3C is a block diagram illustrating, according to one embodiment, an e-mail client associating an action request with an unsent e-mail message.

Unlike the embodiments discussed above regarding FIGS. 3A and 3B, according to the embodiment illustrated in FIG. 3C, a user may have configured Sending Client 300 to associate a read request with an outgoing e-mail message. For example, a human resources manager may send an e-mail message describing an important change to a company policy and associate that e-mail message with a read request to ensure that everyone who receives that e-mail knows they are expected to read it. In the embodiment illustrated in FIG. 3C, Sending Client 300 may be configured to associate Read Request 352 with E-mail Message 366 before transmitting it to Server 310. Server 310 may then transmit E-mail Message 366 on to Receiving Client 320 with its associated Read Request 352.

Figure 3D:
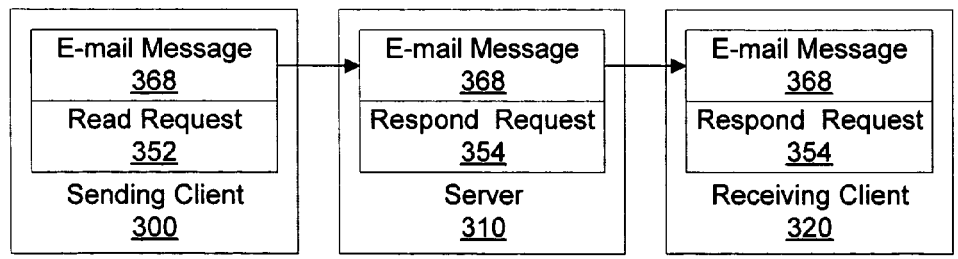
FIG. 3D is a block diagram illustrating, according to one embodiment, an e-mail client associating an action request with an unsent e-mail message, and an e-mail server changing which action request is associated with that e-mail message.

FIG. 3D illustrates an embodiment in which Server 310 may be configured to change the specific action request associated with an e-mail message. This may occur because while a user sending an e-mail message may associate it with a Read Request, the recipient may have configured his e-mail server or client to associate that e-mail with a different action request. For example, when sending John an e-mail message, Sue associates it with a read request. John however, doesn't want to miss an opportunity to reply to Sue, may have configured his e-mail server to associate a respond request will all incoming e-mail messages from Sue.

In one embodiment illustrated by FIG. 3D, Sending Client 300 may transmit E-mail Message 368 with associated Read Request 352 to Server 310. Rather than simply forward message 368 along to Receiving Client 320 with Read Request 352 intact, in this embodiment, Server 310 may associate E-mail Message 368 with Respond Request 354 instead. Server 310 may then send E-mail Message 368 to client 320 with associated Response Request 354.

Figure 3E:
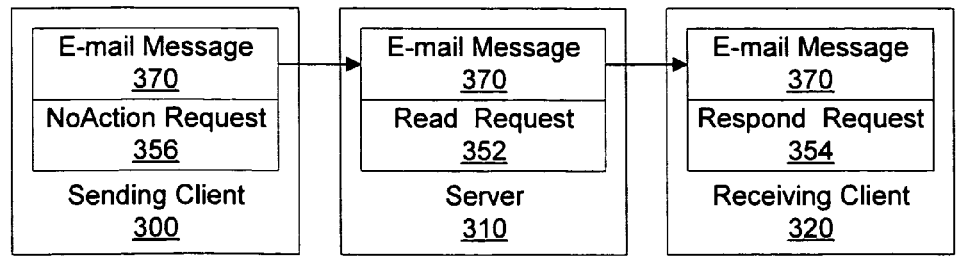
FIG. 3E is a block diagram illustrating, according to one embodiment, a sending e-mail client associating an action request with an unsent e-mail message, an e-mail server changing which action request is associated with that e-mail message, and showing a receiving e-mail client also changing which action request is associated with that e-mail message.

FIG. 3E illustrates an embodiment in which an e-mail message may be associated with three different action requests by Sending Client 300, Server 310 and Receiving Client 320. An example of this might occur, in one embodiment, when different users configure Sending Client 300, Server 310 and Receiving Client 320 to associate action requests with e-mail messages for different reasons. For example, in one embodiment, one user may manually associate one action request with an outgoing e-mail in Sending Client 300, the recipient may have configured Server 310 to associate a different action request with e-mail messages from that particular sender, and the recipient may also have configured Receiving Client 320 to associate yet another action request with e-mail messages that have certain keywords in the subject. According to such an embodiment, Sending Client 300 may transmit E-mail Message 370 with associated No-action Request 356 to Server 310. Rather than simply forward E-mail Message 370 along to Receiving Client 320 with No-action Request 356 intact, in this embodiment, Server 310 may be configured to associate E-mail Message 368 with Read Request 352 instead. Server 310 may then send E-mail Message 368 to Receiving Client 320 with associated Read Request 352. Receiving Client 320, according to this embodiment may be configured to associate E-mail Message 370 with Response Request 354, regardless of whether E-mail Message 370 is already associated with a different action request.

As another example, according to one embodiment, Bob may send an e-mail message to Alice notifying her that he has shipped her something. Bob may not intend Alice to do anything specific with this message, as it may just be to notify her that a package is being shipped. Therefore, in this example embodiment, Sending Client 300 may be configured to associate E-mail Message 370 with No-action Request 356 and transmit it to Server 310. Alice, in this example, has been waiting for this package from Bob and therefore may have configured her e-mail server to associate any message from Bob with a read request. Therefore, in this example embodiment, Server 310 may be configured to associate E-mail Message 370 with Read Request 352 before transmitting it to Receiving Client 320. As the final part of this example, Alice may also have moved recently and wants to respond to any message informing her of packages being shipped and therefore may have configured her e-mail client to associate any messages with the word "package" in the subject with a response request. So, for this embodiment, Receiving Client 320 may be configured to associate E-mail Message 370 with Response Request 354 upon receipt.

The embodiments in the above examples are intended to demonstrate that e-mail clients and servers may associate action requests with e-mail messages for many reasons and may change the currently associated action requests for numerous reasons. Other embodiments may associate e-mail messages with action requests at different times or places along an e-mail message's route than those illustrated herein.

Figure 4:
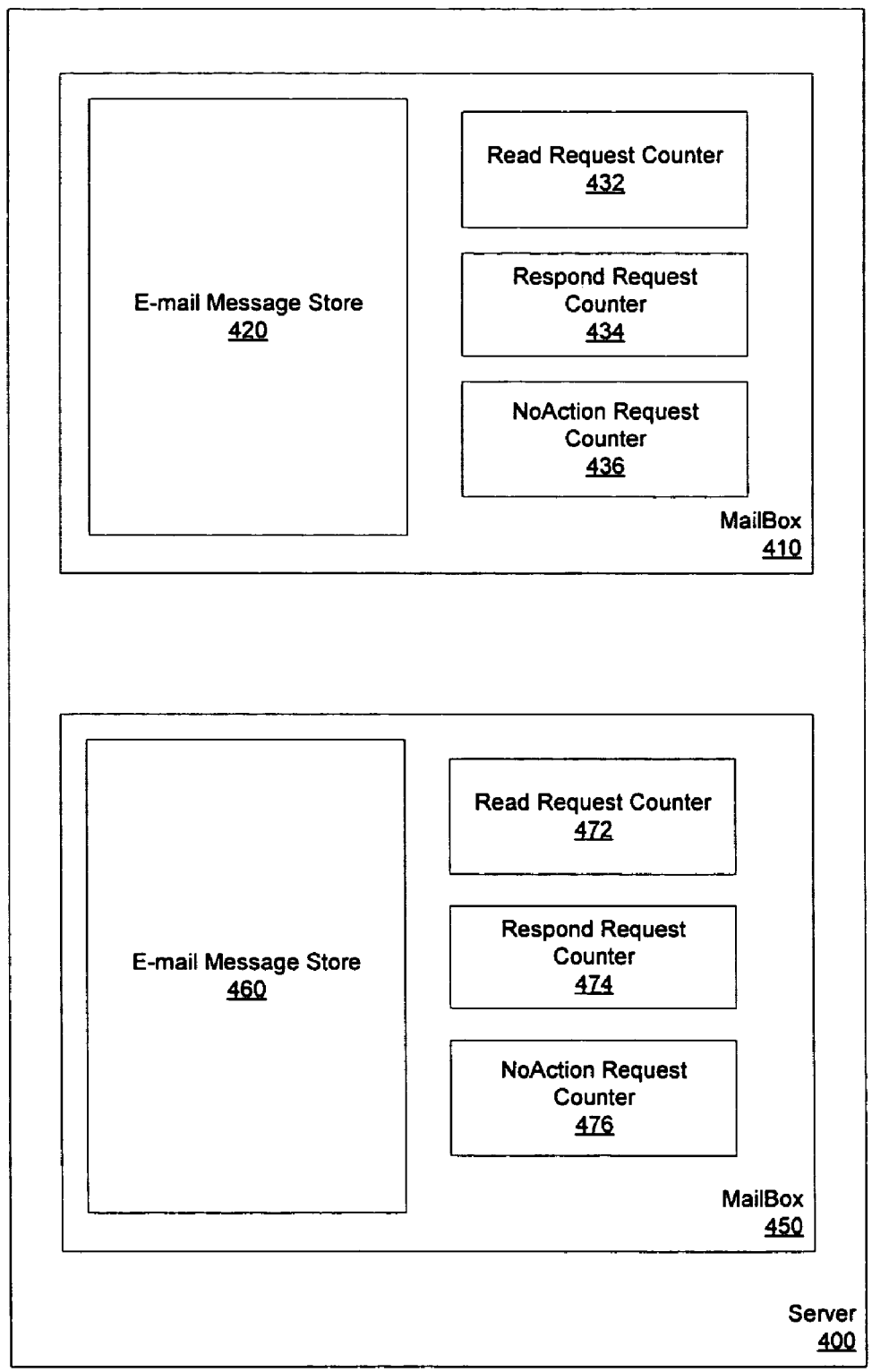
FIG. 4 illustrates one embodiment of an e-mail server configured to maintain action request counters.

FIG. 4, illustrates one embodiment of an e-mail server maintaining action request counters. According to various embodiments, e-mail servers and clients may keep track of and report the number of e-mail message that have associated action requests. E-mail servers or clients may maintain different counters for each type of action request. E-mail servers may report these counts to e-mail clients, or clients may maintain their own counts based upon incoming e-mail messages. Such action request counters, in various embodiments may represent the number of e-mail message that have associated action requests, for which the user has not performed the request action. For example, in one embodiment, a server's read request counter may maintain the number of e-mail messages with associated read requests that have not been read by the user. In such an embodiment, the read request counter may differ from a traditional count of unread messages in that the read request counter reflects the number unread e-mail messages with associated read requests, not the total number of the unread e-mail messages, regardless of whether they have associated action requests. In certain embodiments, e-mail clients may be display these counts so that a user may use such information to prioritize his mailbox when deciding in what order to handle individual e-mail messages.

Various associations of e-mail messages and action requests are illustrated along with various recipient mailboxes. In this embodiment, Server 400 may store email messages in two mailboxes, MailBox 410 and MailBox 450. E-mail messages for one recipient may be stored in E-mail Message Store 420, while e-mail messages for another recipient may be stored in E-mail Message Store 460. According to one embodiment illustrated in FIG. 4, Server 400 also may maintain separate individual sets of counters for action requests in each mailbox. Thus, in one embodiment, Read Request Counter 432 may maintain the number e-mail messages stored in E-mail Message Store 420 with associated read requests, while Read Request Counter 472 may maintain the count of e-mail messages in E-mail Message Store 460.

In one embodiment, Respond Request Counter 444 may increment its current count whenever an e-mail message for MailBox 410 is received and likewise, Respond Request Counter 474 may increment its counter whenever an e-mail message for MailBox 450 is received.

According to one embodiment, action request counters may be decremented whenever the user performs the requested action, or when the associated e-mail message is deleted. Read Request Counter 432 or 472 may be decremented when e-mail messages with associated read requests are read, Respond Request Counter 434 or 474 may be decremented when the user sends a reply to certain e-mail messages, according to one embodiment. In another embodiment, No-action Request Counter 446 may decrement is current count whenever an e-mail message with an associated no-action request in E-mail Message Store 420 is deleted and similarly, No-action Request Counter 476 may decrement is current count whenever an e-mail message with an associated no-action request in E-mail Message Store 460 is deleted.

According to various embodiments, e-mail servers and clients may keep track of action request counters in different manners. Thus, according to one embodiment, Server 400 may maintain action request counters 442, 444, and 446 in MailBox 410 and action request counters 472, 474, and 476 in MailBox 450. In other embodiments, however, Server 400 may keep action request counters separately from mailboxes while maintaining identifiers indicating which mailbox each counter refers.

While in the embodiments illustrated in FIG. 4, Server 400 may only maintain one counter for each type of action request in each mailbox. According to other embodiments, Server 400 may maintain more than one counter. For instance, according to one embodiment, Server 400 may maintain one counter corresponding to the number of unread e-mail messages with an associated action request, while separately keeping track of the total of read e-mail message with an associated action request. In yet another embodiment, Server 400 may maintain a counter corresponding to the number of e-mail messages with associated action requests for which a user has not performed the requested action.

Figure 5:
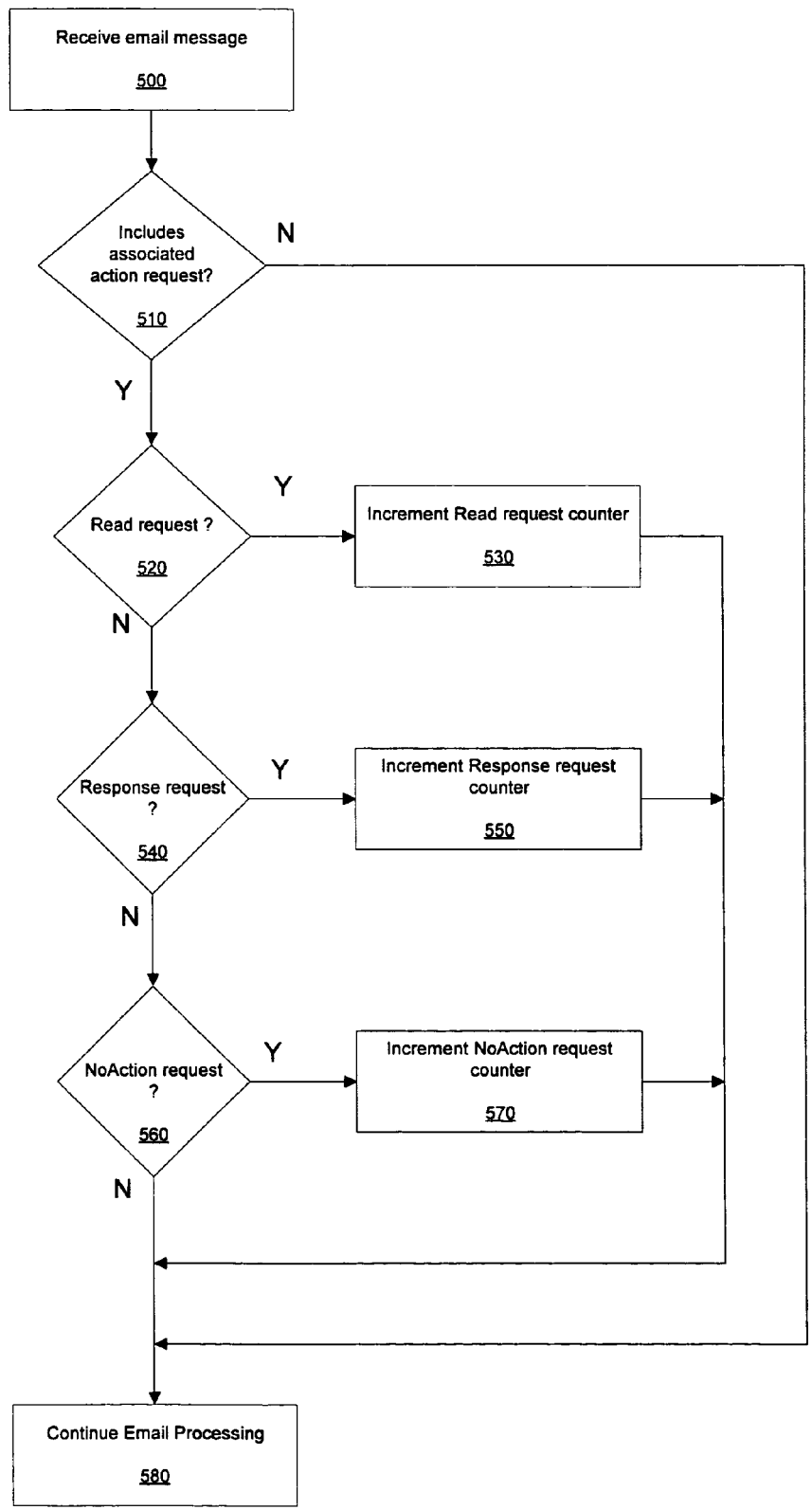
FIG. 5 is a flow diagram illustrating a method for maintaining action request counters in an e-mail server, according to one embodiment.

FIG. 5 illustrates a flow diagram of one embodiment of a method for maintaining action request counters. In this embodiment, there may be three predetermined action requests: a read request, a response request and a no-action request. In various embodiments, e-mail clients, servers or both may perform the method illustrated by FIG. 5. An e-mail message is received, as shown in block 500, and if it is determined that it has an associated action request, as illustrated in block 510, a counter may be incremented. In one embodiment, a different counter may be updated for each of the three predetermined action requests, as illustrated in blocks 530, 550 and 570 and the related decision blocks 520, 540, and 560 respectively, prior to continuing e-mail processing as shown in block 580. Which specific counter is incremented depends upon the specific action request since, in this embodiment, there may be separate action request counters for each predetermined action request. In other embodiments, there may not be a one to one relationship between action request counters and predetermined action requests as in the embodiment illustrated by FIG. 5. Certain embodiments may only maintain one counter which corresponds to the total number of received e-mail have an associated action request of any time. Other embodiments may maintain individual counters for some action requests and not others.

According to one embodiment illustrated by FIG. 5, an email client (or server) may determine that an email message has an associated read request as shown in block 520. If so, in such an embodiment, the client may then increment a read request counter, as shown in block 530. While not illustrated in FIG. 5, certain embodiments may also decrement a read request counter once a user has read an e-mail message with an associated read request. In other embodiments, an e-mail client may be configured to decrement a read request counter when a user manually marks an e-mail message as being read, regardless of whether it was actually read or not.

As shown in decision block 540, according to one embodiment, an e-mail server (or client) may determine that an e-mail message has an associated response request, may then increment a response request counter as shown in block 550. As with read requests above, a server or client may be configured to decrement a response request counter once a user has performed the requested action. For example, in one embodiment, a server may decrement a response request counter, as shown in block 550, when a user has sent a reply to the associated e-mail message. Alternatively, in another embodiment, a user may manually instruct an e-mail client to consider a response request fulfilled, in which case the client would decrement the appropriate response request counter. For example, a user may have dealt the content of an e-mail message by phone, or may have responded to the two related received e-mail messages in one reply and therefore may manually cause an e-mail client to decrement a response request counter, in one embodiment.

In one embodiment, an e-mail client may determine that an e-mail message has an associated no-action request as shown in decision block 560, and may then increment a no-action request counter, as shown in block 570. As with read requests and response requests, in certain embodiments e-mail clients and servers may also decrement a no-action request counter, even though not illustrated in FIG. 5. A no-action request counter may be decremented when a user deletes an associated e-mail message, or when a user manually instructs an e-mail client or server to do so, according to various embodiments.

E-mail clients may be configured to display counts of e-mails with associated action requests to a user, according to some embodiments. Before being able to display action request counts, e-mail clients may need to obtain such counts. In certain embodiments, e-mail clients, especially thin clients, may rely upon an e-mail server to maintain action request counters and to provide current counts to the e-mail client for displaying. In other embodiments, however, e-mail clients may maintain their own counts of incoming e-mail messages with associated action requests. In such an embodiment, the e-mail client may increment action request counters when e-mail messages arrive and may decrement action request counts based upon user actions, such as reading, responding to, or deleting an e-mail message. In yet other embodiments, an e-mail client may compare its own count action requests with server provided action request counts, thereby possibly detecting errors or discrepancies in e-mail message or action request delivery. When a server may transmit action request counts to e-mail clients may vary among embodiments. For example, one user may desire to have her e-mail server update and send the latest counts automatically whenever a new e-mail message with an associated action request arrives, while another user may wish to manually request that action request counts be transferred and not have any automatic transmission of action request counts. For instance, in one embodiment, an e-mail client may maintain its own set of action request counts based upon incoming e-mail messages, and still periodically request counts from a server in order to help detect missed messages or other e-mail errors or discrepancies.

Figure 6A:
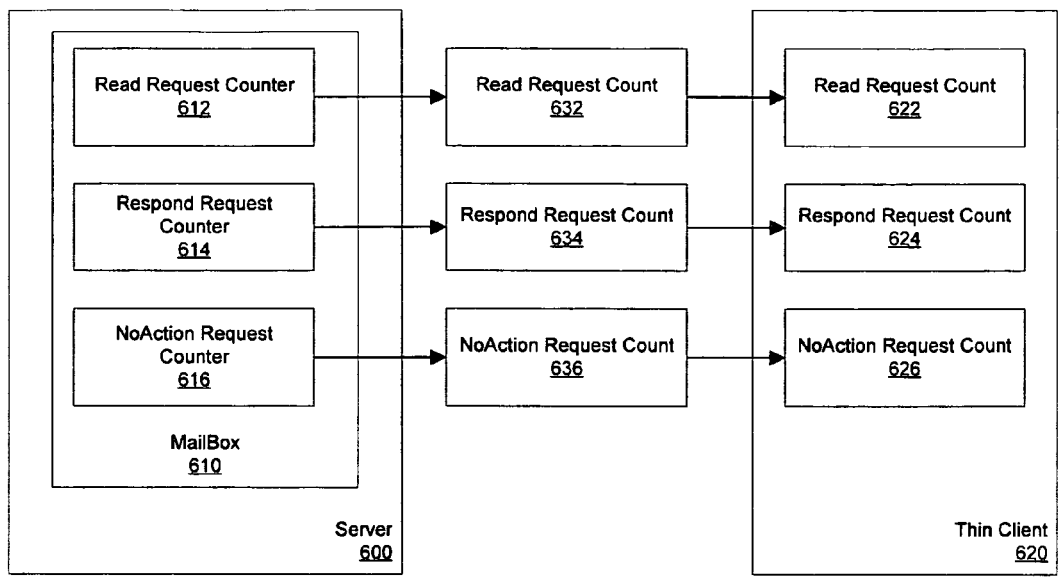
FIG. 6A illustrates, according to one embodiment, a method for an e-mail to transmit action request counters to a client.
Figure 6B:
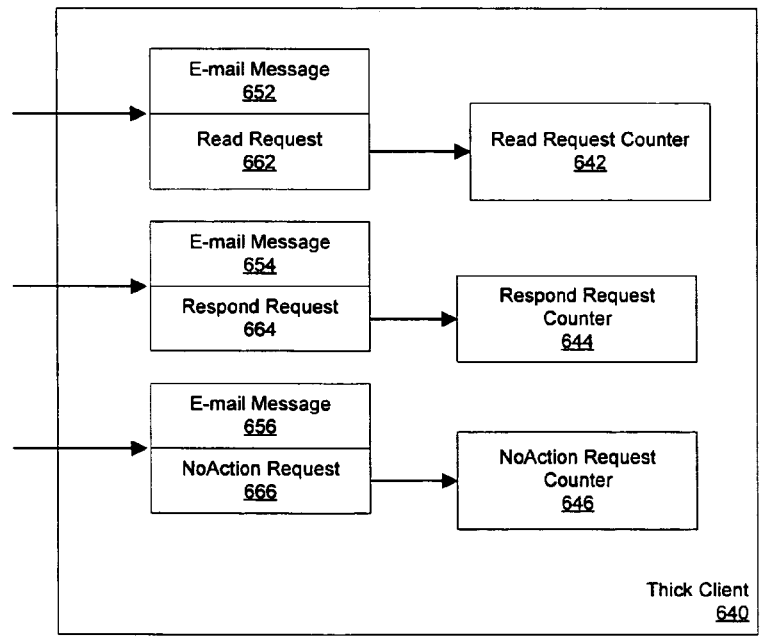
FIG. 6B illustrates, according one embodiment, a method for an e-mail client to maintain action request counters.

FIGS. 6A and 6B illustrate various embodiments of the e-mail clients obtaining action request counts. The action request counts illustrated in FIGS. 6A and 6B, according to various embodiments are different from the number of unread or new messages maintained and reported by traditional e-mail servers. As illustrated in FIGS. 6A and 6B and discussed above, e-mail servers and clients may keep track of the number of e-mail messages that have associated action requests, in some embodiments. Additionally, according to certain embodiments, e-mail servers and clients may keep track of the number of e-mail messages associated with action requests that have not been dealt with be the user. The embodiments illustrated by FIGS. 6A and 6B, demonstrate two possible methods for a client to obtain action request counts. In certain embodiments, an e-mail client may receive the counts from a server, but in other embodiments, an e-mail client may calculate the counts itself based upon the e-mail messages it may receive with associated action requests and based upon users performing the requested actions.

In one embodiment, illustrated in FIG. 6A, Server 600 may maintain action request counters and provide them to Thin Client 620. Server 600 may maintain three counters in MailBox 610. In this embodiment, Server 600 may keep track of read requests, response requests and no-action requests using three counters, Read Request Counter 612, Respond Request Counter 614 and No-action Request Counter 616, respectively. Server 600 may then transmit the current count from each of those counters to Thin Client 620, as illustrated by Read Request Count 632, Respond Request 634, and No-action Request 636, according to one embodiment. For ease of discussion, FIG. 6A illustrates a direct link between Server 600 and Thin Client 620. Please note however, that in certain embodiments the delivery of action request counts between Server 600 and Thin Client 620 may involve many, possible diverse, devices, interfaces, or protocols.

Upon receipt of Read Request Count 632, Respond Request Count 634, or No-action Request Count 636, Thin Client 620, in one embodiment, may save its own copy of those counts in Read Request Counter 622, Respond Request Counter 624, and No-action Request Counter 626, respectively. In such an embodiment, Thin Client 620 may display those counts to a user continuously. In other embodiments, Thin Client 620 may not keep local copies of action request counts and display such counts only when transmitted by Server 600.

FIG. 6B illustrates an embodiment where Thick Client 640 may be configured to increment it own action request counters based upon incoming e-mail messages and their associated action requests. According to certain embodiments, e-mail clients may maintain their own action request counters thus allowing two clients to implement e-mail message action requests even if using one or more e-mail servers that may not be configured to implement e-mail message action requests.

For instance, in one embodiment, Thick Client 652, after receiving E-mail Message 652 with associated Read Request 662, may increment Read Request Counter 642. Additionally, in some embodiments, Thick Client 640 may also display the current count from Read Request Counter 642 for the user.

Similarly, in one embodiment, Thick Client 640 may increment Respond Request Counter 644, after receiving E-mail Message 654 with associated Respond Request 664. In another embodiment, Thick Client 640 may decrement Respond Request Counter 644 after a user sends a reply to E-mail Message 654. In yet another example, according to one embodiment, Thick Client 640 may increment No-action Request Counter 646 in response to receiving E-mail Message 656 with associated No-action Request 666 and may decrement No-action Request Counter 646 in response to a user deleting E-mail Message 656.

Figure 7:
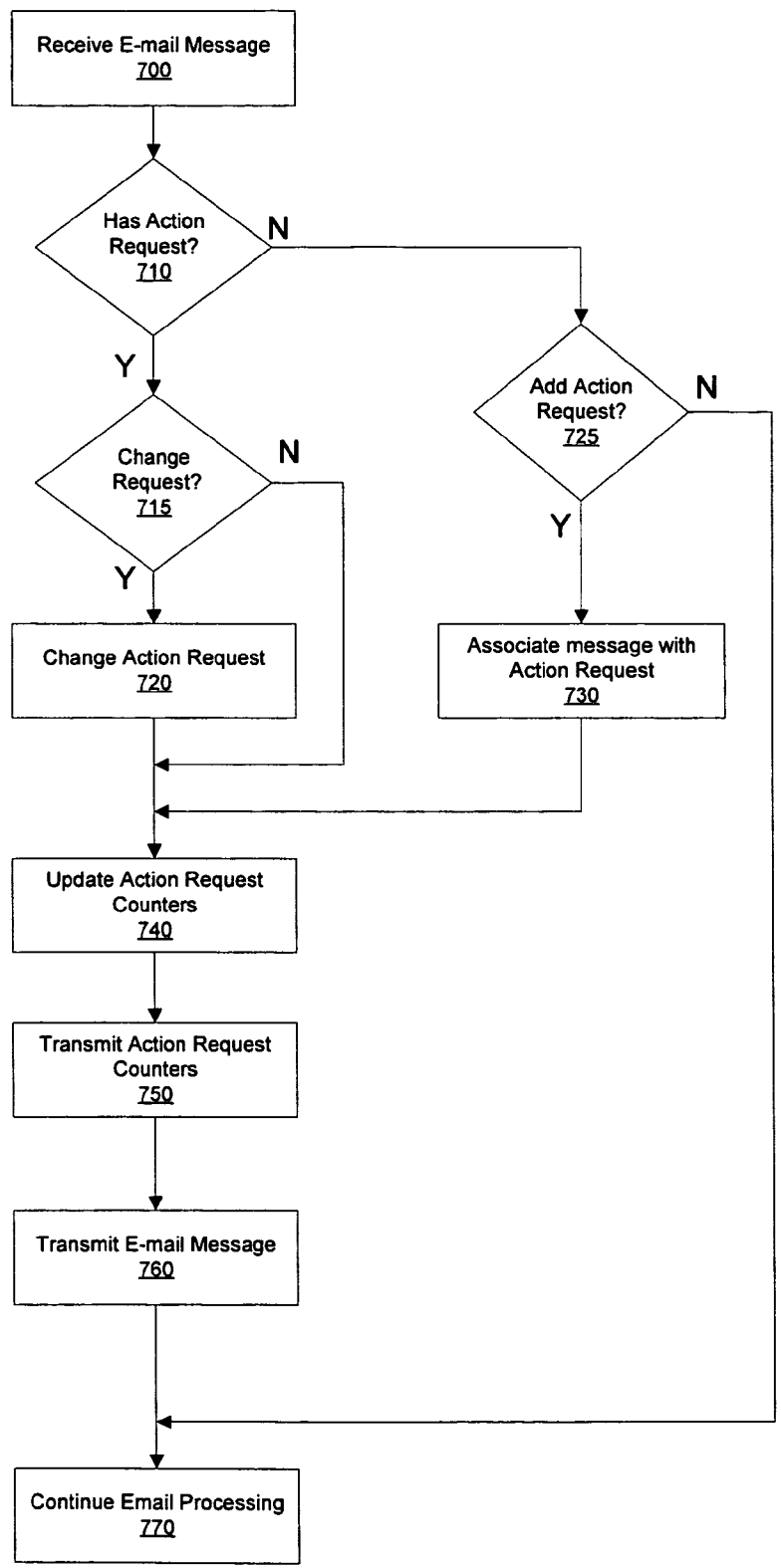
FIG. 7 is a flow diagram illustrating a method for implementing e-mail message action requests in an e-mail server, according to one embodiment.

FIG. 7 illustrates a method, according to one embodiment, of implementing e-mail message action request processing in an e-mail server. While the preceding discussions have generally focused on individual aspects of e-mail message action requests, like associating action requests with e-mail messages or maintaining counts of e-mail with associated action requests, according to various embodiments, the discussion of those embodiments illustrated by FIG. 7 will focus on a more overall view of a method, in one embodiment, for an e-mail server to implement e-mail message action requests.

In the method illustrated by FIG. 7, according to one embodiment, a server receives an e-mail message that may or may not have an associated action request. If the e-mail message does not have an associated action request, the server may associate it with an action request as discussed above regarding the embodiments illustrated in FIGS. 2A, 2B and in FIGS. 3A-3E. If the e-mail message is already associated with an action request, the server may change the action request associated with the message. Additionally, the server may update and transmit its action request counts. E-mail servers may, according to certain embodiments, transmit the e-mail message after either adding to changing its action request association. For example, an e-mail server may store e-mail messages until an e-mail client request them, or a server may be configured to automatically forward e-mail messages to other devices, in some embodiments. In such embodiments, action requests may be associated with e-mail messages before those messages are forwarded.

In one embodiment illustrated by FIG. 7, an e-mail server may, after receiving an e-mail message as shown in block 700, determine whether or not the e-mail message has an associated action request, as shown in decision block 710. Now according to this embodiment, if the e-mail message does not have an associated action request, the server may then determine whether or not to add an associated action request, as illustrated in request block 725. In some embodiments, the server may be configured to refer to user-configured policies or rules when deciding whether or not to associate the incoming e-mail message with an action request, as discussed above. If the server determines that no action request should be associated with this e-mail message, the server may then perform no further processing related to action requests on this e-mail message, as shown by the line connecting the negative exit from decision block 725 to block 770.

If however, according to one embodiment, the server determines that an action request should be associated with this e-mail message, including, but not limited to, any of the reasons discussed above regarding FIGS. 2A and 2B, the server may then associate the action request with the e-mail message, as shown in block 730.

Now, in one embodiment, if the server determines that the received e-mail does have an associate action request, the server may still change that action request as shown in decision block 715 and then it may associate a different action request as shown in block 720. In certain embodiments, a server may automatically change an e-mail message's associated action request for various reasons including, but not limited to, those discussed above. Additionally, however, in certain embodiments, a user may manually cause the server to change an e-mail messages associated action request. A web browser based or thin client may provide a user with the capability to instruct the server to change an associated action request, in some embodiments.

According to an embodiment illustrated by FIG. 7, the server may also update the appropriate action request counter, as shown in block 740, and may transmit the current count for that action request counter, as shown in block 750. Some of the possible reasons and methods for updating and transmitting action request counter are described above regarding the embodiments illustrated by FIGS. 4, 5, 6A, and 6B.

Before continuing with any other e-mail processing, as shown in block 770, the server may transmit the e-mail message, as discussed above and as shown in block 760, according to one embodiment.

FIG. 7 is intended to illustrate one example of a method according to one of many possible embodiments. Other embodiments may perform these actions in some other sequential or parallel order, with or without additional actions, than that demonstrated by this embodiment. In addition, this embodiment shows several decision blocks that may or may not be present in other embodiments.

Figure 8:
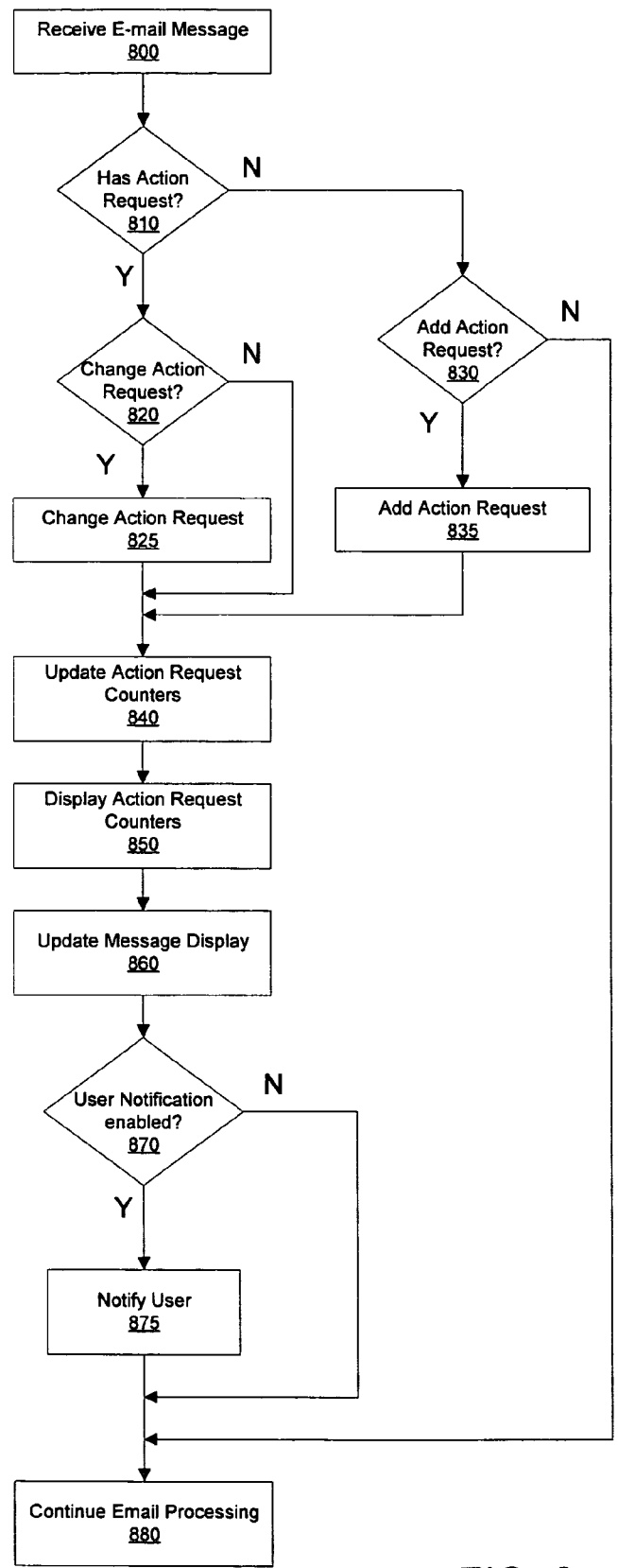
FIG. 8 is a flow diagram illustrating a method for implementing e-mail message action requests in an e-mail client, according to one embodiment.

FIG. 8 illustrates a flow diagram of one embodiment of a method for client processing of an action request associated with a received e-mail message. As with the above discussion of FIG. 7, the discussion regarding the method illustrated in FIG. 8 will focus on an overall method for an e-mail client to implement e-mail message action requests, according to certain embodiments. E-mail clients may receive some e-mail message that are associated with action requests and some that aren't. According to some embodiments, e-mail clients may associate action requests with e-mail messages that aren't already associated with action requests an may associate different action requests with e-mail messages that are already associated with action requests, as discussed above regarding FIGS. 2A, 2B, and 3A-3E. Some e-mail clients may maintain action request counters, while others may rely upon an e-mail server to supply such counters, according to various embodiments and as discussed above regarding FIGS. 6A and 6B. In certain embodiments, e-mail clients may display various types of information to users, such as the current count of e-mail messages associated with different action requests, or the action requests associated with particular e-mail messages. E-mail clients may be configured to alert the user to the arrival of e-mail messages associated with certain action requests, in one embodiment. Additionally an e-mail client may modify how information about e-mail messages is displayed to a user based upon what action requests are associated with e-mail messages. For instance, in one embodiment, a user may configure her e-mail client to display only those e-mail messages associated with certain action requests. Alternatively, in one embodiment, a user may search for particular e-mail messages associated with specific action requests.

In one embodiment, the client may receive an e-mail message, as shown in block 800, and may then determine whether or not the message has an associated action request, as shown in decision block 810. According to such an embodiment, if the message does not have an associated action request, the client may then determine whether or not to add an associated action request, as illustrated in request block 830. If it is determined that no action request should be associated with this e-mail message, the client may not perform any further action request related processing on this e-mail message, as shown by the line connecting the negative exit from decision block 830 to block 890.

If however, in this embodiment, it is determined that an action request should be associated with this e-mail message, then the client may associate the action request with the e-mail message, as shown in block 835.

Now, if in one embodiment, the client determines that the received e-mail did have an associated action request, the client may then determine to change that action request as shown in decision block 820 and may then associate a different action request as shown in block 825. According to such an embodiment, the client may do several things, including update the appropriate action request counter, as shown in block 840, display the new count for the appropriate action request counter as shown in block 850, and/or update any message displays to indicate the type of the associated action request, as shown in block 860. Specific examples of updating e-mail message displays according to associated action requests are discussed below regarding FIGS. 9A and 9B.

Also in this embodiment, the client may determine, as shown in decision block 870, to notify the user that an e-mail message with an associated action request has been received. As shown in block 875, the client may notify the user of the arrival of e-mail messages associated with certain action requests. The specific methods a client may take to notify a user may vary according to different embodiments. For example, in one embodiment the client may display an alert box, play an audio file or display an icon, before continuing on with any other e-mail processing as shown in block 890. In other embodiments, e-mail clients may be configured to alert the user in other ways.

Please note that the flow diagram in FIG. 8 is intended to illustrate just one example embodiment and that other embodiments may perform these actions in other sequential or parallel orders, with or without additional actions. In addition, this embodiment shows several decision blocks that may or may not be present in other embodiments.

FIGS. 9A and 9B illustrate, according to one embodiment, various ways of displaying action requests associated with e-mail messages to a user. Both figures illustrate using a grid to show summary information about e-mail messages. In one embodiment, summary information for an e-mail message may be displayed in a grid row including the associated action request, the sender and the subject for the e-mail message.

FIG. 9A illustrates a display conforming to one embodiment wherein a client may display a grid showing information about a list of e-mail messages sorted by their associated action requests. In such an embodiment, each horizontal line in the grid may show information about one e-mail message. According to this embodiment, a client program may be configured to display the action requests associated with e-mail messages, as column 922 of grid 900 in FIG. 9A illustrates. A client may also use other columns to show who sent the e-mail message or display the subject of the e-mail message, as shown, according to one embodiment, by columns 924 and 926, respectively. According to this embodiment, a client may sort the grid lines into different groupings. Each grouping may correspond to those e-mail messages that are associated with the same action request. For example, in one embodiment, illustrated in FIG. 9A, grouping 912 may show three e-mail messages associated with a Read request, while grouping 914 may show four e-mail messages associated with a Respond Request and grouping 916 may show two e-mail messages associated with a No-action Request.

FIG. 9B illustrates a grid display, according to one embodiment, where an e-mail client may show information about e-mail messages filtered by their associated action request. As with FIG. 9A, a client may be configured to use column 922 of grid 900 to show the action request associated with each e-mail message and use columns 924 and 926 to show the sender and subject information of the e-mail message. As with the embodiment illustrated by FIG. 9A, discussed above, a client may use a grouping of lines within the grid to group e-mail messages associated with the same action request. In this particular embodiment, grouping 962 shows three e-mail messages associated with a Read request. An e-mail client, according to this embodiment, may filter the e-mail messages so that grid 900 only shows e-mail messages associated with read requests. Even though the specific embodiments used above refer to e-mail clients sorting and filtering e-mail messages according to action requests, in certain embodiments e-mail servers may perform this sorting or filtering on behalf of clients. This would be especially true in embodiments where a server may be providing these e-mail messages to a thin client that is not configured to perform these sorts and filters itself. However, according to other embodiments, a thin e-mail client may be configured to perform sorting or filtering of e-mail messages according to action request. In some embodiments an e-mail client, whether thick or thin may be configured to resort or further filter e-mail messages, according to action requests, even when a server may have already sorted or filtered those e-mail messages according to associated action requests.

Thus, as illustrated by FIGS. 9A and 9B, and according to various embodiments, e-mail clients and servers may sort, categorize, search or filter e-mail messages according to their associated action requests.

Figure 10:
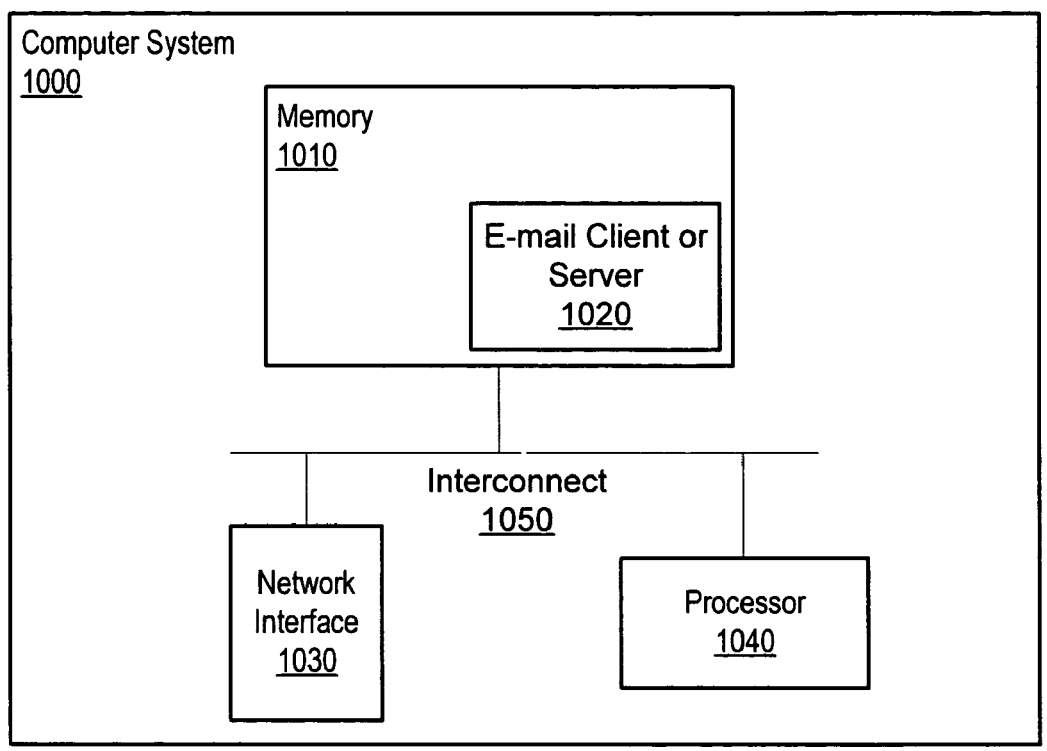
FIG. 10 is a block diagram illustrating, according to one embodiment a computer system that may be configured to implement e-mail message action requests.

FIG. 10 illustrates a computing system in which e-mail messaging may be employed and which may be configured as any of the computer systems and devices described above, according to various embodiments. Computer system 1000 may be any of various types of devices, including, but not limited to, a personal computer system, desktop computer, laptop or notebook computer, mainframe computer system, handheld computer, workstation, network computer, a consumer device such as a mobile phone, pager, PDA, a smart appliance, or any type of networkable peripheral device such as storage devices, switches, modems, routers, etc, or in general any type of networkable computing device with a digital heartbeat. Computer system 1000 may include at least one processor 1040. The processor 1040 may be coupled to a memory 1010 and a network interface 1030. Network 1030 may be any of various types of interfaces configured to couple with and communicate over Network 100 or Network 160 illustrated in FIG. 1 and described above.

Memory 1010 is representative of various types of possible memory media, also referred to as "computer accessible media." Hard disk storage, floppy disk storage, removable disk storage, flash memory and random access memory (RAM) are examples of memory media. The terms "memory" and "memory medium" may include an installation medium, e.g., a CD-ROM or floppy disk, a computer system memory such as DRAM, SRAM, EDO RAM, SDRAM, DDR SDRAM, Rambus RAM, etc., or a non-volatile memory such as a magnetic media, e.g., a hard drive or optical storage. The memory medium may include other types of memory as well, or combinations thereof. In some embodiments, Memory 1010 may include program instructions configured to receive e-mail messages with associated predetermined action requests and maintain illustrates action request counters indicating to the number of e-mail message associated with various types of action requests. In one embodiment memory 1010 may include program instruction configured to implement an e-mail client or server as shown in block 1020. In such an embodiment, an e-mail client or server may include program instructions configured to receive e-mail messages with associated predetermined action requests and maintain action request counters indicating the number of e-mail message associated with various types of action requests, as described herein.

Although the embodiments above have been described in considerable detail, numerous variations and modifications will become apparent once the above disclosure is fully appreciated. It is intended that the following claims be interpreted to embrace all such variations and modifications.

What is claimed is:

1. A method, comprising:
   receiving an e-mail message comprising an explicit action request, wherein the explicit action request is one of a plurality of predetermined explicit action requests, and each of the plurality of predetermined explicit action requests indicates an explicit action to be performed by a recipient of the e-mail message in response to the recipient's receiving the e-mail message; and
   in response to said receiving said e-mail message, incrementing one counter of a plurality of action request counters, wherein the one counter indicates the number of e-mail messages addressed to a particular recipient which:
      comprise the explicit action request, and
      for which the explicit action request has not yet been performed by the particular recipient; and
   wherein each respective one of the plurality of action request counters indicates the number of e-mail messages addressed to a particular recipient which:
      comprise a respective predetermined explicit action request of said plurality of predetermined explicit action requests, and
      for which the respective predetermined explicit action request has not yet been performed by the particular recipient.

2. The method of claim 1, wherein the e-mail message comprises a header and wherein a field of the header indicates the explicit action request.

3. The method of claim 1, wherein the plurality of counters is one of multiple pluralities of counters, and wherein each plurality of counters corresponds to a different one of a plurality of recipient mailboxes.

4. The method of claim 1, wherein the explicit action request indicates a read request signifying to a user that the corresponding e-mail message should be read.

5. The method of claim 1, wherein the explicit action request indicates a response request signifying to a user that the corresponding e-mail message should be responded to.

6. The method of claim 1, wherein the explicit action request indicates a no-action request signifying to a user that no action should be taken regarding the corresponding e-mail message.

7. The method of claim 1, wherein said receiving and said incrementing is performed by an e-mail server.

8. The method of claim 1, further comprising:
   after said incrementing said one counter in response to said receiving said e-mail message,
      transmitting one or more counts from a respective one or more counters of the plurality of counters to an e-mail client; and
      transmitting said e-mail message to said e-mail client.

9. The method of claim 8, wherein said e-mail client is a web browser based thin client.

10. The method of claim 8, further comprising said e-mail client displaying the one or more counts to indicate to a user the number of e-mail messages received associated with a corresponding predetermined explicit action request.

11. The method of claim 1, wherein an e-mail client performs said receiving and said incrementing.

12. The method of claim 11, further comprising said e-mail client displaying one or more counts from a respective one or more counters of the plurality of counters to indicate to a user the number of e-mail messages received associated with a corresponding predetermined explicit action request.

13. The method of claim 11, further comprising said e-mail client generating a user notification in response to receiving the e-mail message, wherein said user notification indicates to a user which predetermined explicit action request is comprised within the e-mail message.

14. The method of claim 13, wherein said generating comprises:
   said e-mail client performing one or more of:
      displaying an alert message associated with the e-mail message and including information about the explicit action request;
      displaying an icon associated with the e-mail message and corresponding to the explicit action request; or
      playing an audio file associated with the e-mail message and corresponding to the explicit action request.

15. The method of claim 1, further comprising a sender associating the explicit action request with the e-mail message prior to said receiving.

16. The method of claim 1, further comprising:
   an e-mail server receiving the e-mail message without the explicit action request; and
   said e-mail server including the explicit action request with the e-mail message in response to receiving the e-mail message.

17. The method of claim 1, further comprising:
   in response to receiving said e-mail message, applying e-mail processing rules to said e-mail message, wherein said e-mail processing rules indicate associating said e-mail message with a second predetermined explicit action request;
   wherein said applying comprises changing said explicit action request to include said second predetermined explicit action request prior to incrementing said counter; and
   wherein said counter corresponds to said second predetermined explicit action request.

18. The method of claim 1, further comprising:
   searching a set of e-mail messages to locate a subset of one or more e-mail messages associated with a user-specified explicit action request indicating one of said plurality of predetermined explicit action requests; and
   displaying the results of said searching to a user.

19. The method of claim 18, further comprising:
   an e-mail client sending a search request indicating said user-specified explicit action request to an e-mail server;
   said e-mail server performing said searching in response to receiving said search request; and
   said e-mail server sending the results of said searching to said e-mail client.

20. The method of claim 1, further comprising:
   sorting a plurality of e-mail messages by their explicit action requests according to a user-specified ordering of action requests; and
   displaying the results of said sorting to a user.

21. The method of claim 20, further comprising:
   an e-mail client sending a sort request indicating said user-specified ordering of action requests to an e-mail server;
   said e-mail server performing said sorting in response to receiving said sort request; and
   said e-mail server sending the results of said sorting to said e-mail client.

22. A computer-readable storage medium storing program instructions, wherein the program instructions are computer-executable to implement:
   receiving an e-mail message comprising an explicit action request, wherein the explicit action request is one of a plurality of predetermined explicit action requests, and each of the plurality of predetermined explicit action requests indicates an explicit action to be performed by a recipient of the e-mail message in response to the recipient's receiving the e-mail message; and in response to said receiving said e-mail message, incrementing one counter of a plurality of action request counters, wherein the one counter indicates the number of e-mail messages addressed to a particular recipient which:

comprise the explicit action request, and for which the explicit action request has not yet been performed by the particular recipient; and wherein each respective one of the plurality of action request counters indicates the number of e-mail messages addressed to a particular recipient which:

comprise a respective predetermined explicit action request of said plurality of predetermined explicit action requests, and for which the respective predetermined explicit action request has not yet been performed by the particular recipient.

23. The computer readable storage medium of claim 22, wherein the e-mail message comprises a header and wherein a field of the header indicates the explicit request.

24. The computer readable storage medium of claim 22, wherein the plurality of counters is one of multiple pluralities of counters, and wherein each plurality of counters corresponds to a different one of a plurality of recipient mailboxes.

25. The computer readable storage medium of claim 22, wherein the explicit action request indicates a read request signifying to a user that the corresponding e-mail message should be read.

26. The computer readable storage medium of claim 22, wherein the explicit action request indicates a response request signifying to a user that the corresponding e-mail message should be responded to.

27. The computer readable storage medium of claim 22, wherein the explicit action request indicates a no-action request signifying to a user that no action should be taken regarding the corresponding e-mail message.

28. The computer readable storage medium of claim 22, wherein said receiving and said incrementing is performed by an e-mail server.

29. The computer readable storage medium of claim 22, wherein the program instructions are further computer-executable to implement:

transmitting one or more counts from a respective one or more counters of the plurality of counters to an e-mail client;

transmitting said e-mail message to said e-mail client; and wherein said transmitting one or more counts and said transmitting said e-mail message occur after said incrementing said one counter in response to said receiving said e-mail message.

30. The computer readable storage medium of claim 29, wherein the e-mail client is a web browser based thin client.

31. The computer readable storage medium of claim 29, wherein the program instructions are further computer-executable to implement:

said e-mail client displaying the one or more counts to indicate to a user the number of e-mail messages received associated with a corresponding predetermined explicit action request.

32. The computer readable storage medium of claim 22, wherein an e-mail client performs said receiving and said incrementing.

33. The computer readable storage medium of claim 32, wherein the program instructions are further computer-executable to implement:

said e-mail client displaying one or more counts from a respective one or more counters of the plurality of counters to indicate to a user the number of e-mail messages received associated with a corresponding predetermined explicit action request.

34. The computer readable storage medium of claim 32, wherein the program instructions are further computer-executable to implement:

said e-mail client generating a user notification in response to receiving the e-mail message, wherein the user notification indicates to a user which predetermined explicit action request is comprised within the e-mail message.

35. The computer readable storage medium of claim 34, wherein said generating comprises:

the e-mail client performing one or more of:

displaying an alert message associated with the e-mail message and including information about the explicit action request;

displaying an icon associated with the e-mail message and corresponding to the explicit action request; or playing an audio file associated with the e-mail message and corresponding to the explicit action request.

36. The computer readable storage medium of claim 22, wherein the program instructions are further computer-executable to implement:

a sender associating the explicit action request with the e-mail message prior to said receiving.

37. The computer readable storage medium of claim 22, wherein the program instructions are further computer-executable to implement:

an e-mail server receiving the e-mail message without the explicit action request; and said e-mail server including the explicit action request with the e-mail message in response to receiving the e-mail message.

38. The computer readable storage medium of claim 22, wherein the program instructions are further computer-executable to implement:

in response to receiving said e-mail message, applying e-mail processing rules to said e-mail message, wherein said e-mail processing rules indicate associating said e-mail message with a second predetermined explicit action request;

wherein said applying comprises changing said explicit action request to include said second predetermined explicit action request prior to incrementing said counter; and wherein said counter corresponds to said second predetermined explicit action request.

39. The computer readable storage medium of claim 22, wherein the program instructions are further computer-executable to implement:

searching a set of e-mail messages to locate a subset of one or more e-mail messages associated with a user-specified explicit action request indicating one of said plurality of predetermined explicit action requests; and displaying the results of said searching to a user.

40. The computer readable storage medium of claim 39, wherein the program instructions are further computer-executable to implement:

an e-mail client sending a search request indicating said user-specified explicit action request to an e-mail server;

said e-mail server performing said searching in response to receiving said search request; and said e-mail server sending the results of said searching to said e-mail client.

41. The computer readable storage medium of claim 22, wherein the program instructions are further computer-executable to implement:
   sorting a plurality of e-mail messages by their explicit action requests according to a user-specified ordering of action requests; and
   displaying the results of said sorting to a user.

42. The computer readable storage medium of claim 41, wherein the program instructions are further computer-executable to implement:
   an e-mail client sending a sort request indicating said user-specified ordering of action requests to an e-mail server;
   said e-mail server performing said sorting in response to receiving said sort request; and
   said e-mail server sending the results of said sorting to said e-mail client.

43. A device, comprising:
   a processor; and
   a memory coupled to said processor comprising program instructions configured to implement:
      receiving an e-mail message comprising an explicit action request, wherein the explicit action request is one of a plurality of predetermined explicit action requests, and each of the plurality of predetermined explicit action requests indicates an explicit action to be performed by a recipient of the e-mail message in response to the recipient's receiving the e-mail message; and
      in response to said receiving said e-mail message, incrementing one counter of a plurality of action request counters, wherein the one counter indicates the number of e-mail messages addressed to a particular recipient which:
         comprise the explicit action request, and
         for which the explicit action request has not yet been performed by the particular recipient; and
      wherein each respective one of the plurality of action request counters indicates the number of e-mail messages addressed to a particular recipient which:
         comprise a respective predetermined explicit action request of said plurality of predetermined explicit action requests and
         for which the respective predetermined explicit action request has not yet been performed by the particular recipient.

44. The device of claim 43, wherein the e-mail message comprises a header and wherein a field of the header indicates the explicit action request.

45. The device of claim 43, wherein the plurality of counters is one of multiple pluralities of counters, and wherein each plurality of counters corresponds to a different one of a plurality of recipient mailboxes.

46. The device of claim 43, wherein the explicit action request indicates a read request signifying to a user that the corresponding e-mail message should be read.

47. The device of claim 43, wherein the explicit action request indicates a response request signifying to a user that the corresponding e-mail message should be responded to.

48. The device of claim 43, wherein the explicit action request indicates a no-action request signifying to a user that no action should be taken regarding the corresponding e-mail message.

49. The device of claim 43, wherein said receiving and said incrementing is performed by an e-mail server.

50. The device of claim 43, wherein the program instructions are further configured to implement:
   transmitting one or more counts from a respective one or more counters of the plurality of counters to an e-mail client;
   transmitting said e-mail message to said e-mail client; and
   wherein said transmitting one or more counts and said transmitting said e-mail message occur after said incrementing said one counter in response to said receiving said e-mail message.

51. The device of claim 50, wherein said e-mail client is a web browser based thin client.

52. The device of claim 50, wherein the program instructions are further configured to implement:
   said e-mail client displaying the one or more counts to indicate to a user the number of e-mail messages received associated with a corresponding predetermined explicit action request.

53. The device of claim 43, wherein an e-mail client performs said receiving and said incrementing.

54. The device of claim 53, wherein the program instructions are further configured to implement:
   said e-mail client displaying one or more counts from a respective one or more counters of the plurality of counters to indicate to a user the number of e-mail messages received associated with a corresponding predetermined explicit action request.

55. The device of claim 53, wherein the program instructions are further configured to implement:
   said e-mail client generating a user notification in response to receiving the e-mail message, wherein said user notification indicates to a user which predetermined explicit action request is comprised within the e-mail message.

56. The device of claim 55, wherein said generating comprises:
   said e-mail client performing one or more of:
      displaying an alert message associated with the e-mail message and including information about the explicit action request;
      displaying an icon associated with the e-mail message and corresponding to the explicit action request; or
      playing an audio file associated with the e-mail message and corresponding to the explicit action request.

57. The device of claim 43, wherein the program instructions are further configured to implement:
   a sender associating the explicit action request with the e-mail message prior to said receiving.

58. The device of claim 43, wherein the program instructions are further configured to implement:
   an e-mail server receiving the e-mail message without the explicit action request; and
   said e-mail server including the explicit action request with the e-mail message in response to receiving the e-mail message.

59. The device of claim 43, wherein the program instructions are further configured to implement:
   in response to receiving said e-mail message, applying e-mail processing rules to said e-mail message, wherein said e-mail processing rules indicate associating said e-mail message with a second predetermined explicit action request;
   wherein said applying comprises changing said explicit action request to include said second predetermined explicit action request prior to incrementing said counter; and
   wherein said counter corresponds to said second predetermined explicit action request.

60. The device of claim 43, wherein the program instructions are further configured to implement:

searching a set of e-mail messages to locate a subset of one or more e-mail messages associated with a user-specified explicit action request indicating one of said plurality of predetermined explicit action requests; and displaying the results of said searching to a user.

61. The device of claim 60, wherein the program instructions are further configured to implement:

an e-mail client sending a search request indicating said user-specified explicit action request to an e-mail server;

said e-mail server performing said searching in response to receiving said search request; and said e-mail server sending the results of said searching to said e-mail client.

62. The device of claim 43, wherein the program instructions are further configured to implement:

sorting a plurality of e-mail messages by their explicit action requests according to a user-specified ordering of action requests; and displaying the results of said sorting to a user.

63. The device of claim 62, wherein the program instructions are further configured to implement:

an e-mail client sending a sort request indicating said user-specified ordering of action requests to an e-mail server;

said e-mail server performing said sorting in response to receiving said sort request; and said e-mail server sending the results of said sorting to said e-mail client.

\* \* \* \* \*